2,963,360
AGGLOMERATING TITANIFEROUS MATERIALS BY USE OF HYDROCHLORIC ACID

George B. Cobel and Jack A. Rogers, Midland, Mich., assignors to The Dow Chemical Company, Midland, Mich., a corporation of Delaware No Drawing. Filed June 14, 1957, Ser. No. 665,638

8 Claims. (Cl. 75—3)

The invention pertains to the treatment of titaniferous material prior to chlorination thereof and to the subsequent winning of titanium metal from the chlorinated material. It more particularly pertains to the treatment of such material containing impurities which interfere with chlorination.

Titanium metal is commonly produced from titaniferous material by mixing such material with a carbonaceous material, e.g., coke, chlorinating the mixture, as by treating with chlorine gas (referred to generally as chlorination) to form titanium tetrachloride and by-product oxides of carbon, and subsequently reducing the tetrachloride by reacting it with a metal more electropositive than titanium, e.g., magnesium, to produce titanium sponge and the by-product chloride of the reducing metal.

For efficient reaction with the coke and chlorine during the chlorination process, it is necessary that the titaniferous material and the coke each be first pulverized, preferably to a size that about 99 percent will pass through a No. 325 mesh sieve (U.S. Standard Sieve Series). Such a finely divided powder presents problems in the handling and treatment thereof. Among these problems are dust losses and poor porosity of the pulverized material. However, the most serious problem is the formation of glazen or cementitious substances which tend to coat the particles and to clog the interspaces therebetween. Coating the particles greatly lessens the rate of reactivity by rendering the interior of the particles almost inaccessible to the chlorine gas. Clogging the spaces results in channeling and unequal dispersion of the chlorine gas passing therethrough even to the extent that some portions of the bed of pulverized material are by-passed entirely.

Titaniferous material such as rutile, having a high percentage of $TiO_2$ and small percentages of those impurities which form glazy or cementitious substances at the chlorination temperatures may be chlorinated in a fluidized bed comprising the high content $TiO_2$ material and intermixed coke without preliminary treatment and not be plagued by the formation of glazy coatings and clogging of interspaces. Titaniferous material, however, such as ilmenite ore and titanium-bearing slag, e.g., that produced as a by-product from smelters reducing iron ore containing substantial percentages of titanium compounds, form objectionable amounts of cementitious or glazen substances, e.g., siliceous substances, during chlorination. These ores and slags are a valuable potential source of titanium and, by improved processes for their treatment, can become of high economic importance. Among such slags are those produced in the vicinity of the city of Sorel in Quebec Province of Canada and the city of Albany in Oregon State of the United States of America, and in Japan. After a preliminary beneficiation process these slags usually contain at least 72 percent and often as high as 85 percent $TiO_2$ which is a Ti content of between 43 percent and 51 percent of titanium metal.

Attempts have been made to overcome the problems encountered in chlorinating such slags. Among the attempts are agglomerating the coke-titaniferous material into small bodies or masses. Agglomerating the material has required the use of a bonding agent. Such bonding agents as alkali hydroxides, alkali carbonates, coal tar, pitch, dextrin, sulfuric acid, and phosphoric acid have been employed. Agglomerates made by using hydroxides and carbonates have lacked cohesive strength. Sulfuric and phosphoric acids introduce sulphate and phosphate salts into the agglomerate ore bodies and the subsequently produced titanium tetrachloride, which are objectionable. Coal tar, pitch and dextrin all require calcining to remove organic materials.

The principal object of the invention is to provide a method of treating a mixture of pulverized carbonaceous and titaniferous material containing impurities which tends to form cementitious or glazy substances in the chlorination process which will prevent such substances, if formed, from objectionably coating the surfaces of the particles or clogging the spaces between the particles.

A more specific object is to provide a method of agglomerating a mixture of coke and titaniferous material into small bodies by employing a bonding agent which forms no harmful salts therein and which results in such bodies being sufficiently resistant to breakage to permit storage and handling in charging the chlorinating apparatus without appreciable attrition.

The method by which these and related objects of the invention are accomplished will be made apparent by the following description and appended claims.

Broadly, the invention is a method of treating a mixture of carbonaceous and titaniferous material containing impurities which form cementitious or glazy substances at the temperature of the chlorination process comprising admixing hydrochloric acid therewith prior to the chlorination process and conglobating the mixture into pellets or molding and pressing it into briquets and indurating the pellets or briquets by heat preparatory to subsequent chlorination.

The hydrochloric acid strength employed may vary between about 5 percent and a saturated aqueous solution or one of about 37–38 percent by weight at atmospheric conditions. Acid of about 20 percent is often employed, since acid of that strength usually contains water in the desired amount to impart a tacky or molding quality to the acid-treated mixture. The percent of water based on the weight of the mixture being treated varies between 7 or 8 percent and as much as 16 to 18 percent, with 10 to 14 percent usually being used. The optimum water content of a mixture to be conglobated into pellets is usually somewhat greater than that of the mixture to be molded into briquets. The hydrogen chloride content in the green or undried agglomerated bodies should be at least 1 percent and preferably about 3 to 5 percent. Starting with a substantially dry mixture to be treated, the percentage strength of the acid and the ratio of acid to dry mixture controls both the moisture and acid content. For example, if 20 percent hydrochloric acid is used and the green pellets made according to the invention are to contain 14 percent moisture, they will also contain 2.8 percent active HCl. If a 14 percent water content and a 5 percent HCl content are desired, then a 36.6 percent acid is used.

In practicing the invention according to the preferred embodiment, titaniferous material, e.g., by-product titanium-bearing furnace slag, is pulverized to a size that about 99 percent will pass through a 325 mesh screen. A carbonaceous material, e.g., petroleum coke, is pulverized to a similar particle size and the pulverized titaniferous and carbonaceous materials intermixed in proportions employed in the art of reducing ore or slag assaying a given percent of titanium, e.g., between 65 and 77 percent titaniferous material and between 35 and 23 percent coke. The substantially dry mixture is subjected to a rolling motion, as by feeding it into one end, designated the feed end, of a nearly horizontal open-end rotating cylinder. Hydrochloric acid is sprayed on the mixture in the cylinder near the feed end thereof. The cylinder is preferably inclined so that there is a drop of about ¼ to ½ inch per foot along the longitudinal axis of the cylinder from the feed end to the other end or exit end. Usually at least two hydrochloric acid sprays are arranged consecutively. Such an arrangement offers advantages over a single spray since the mixture wetted by the first hydrochloric acid begins to form into cohesive nuclei which, when successively dampened accrete into spheroids, until, by the time the rolling material has gradually moved to the exit end of the cylinder, it is substantially all formed into spheroids.

According to a second embodiment of the invention, the acid and carbonaceous-titaniferous mixture to be treated are mixed in proper proportions in a mixing chamber prior to being fed into a rotating drum and made into pellets therein.

A third embodiment of the invention comprises mixing the carbonaceous-titaniferous mixture and hydrochloric acid in a mixing chamber and then expressing under pressure suitable portions of the mixture into molds, heating the molds, and removing the compacted contents therefrom as suitably-sized briquets.

A further embodiment of the invention comprises mixing the carbonaceous-titaniferous material and hydrochloric acid as in the embodiment above, but differs in that they are molded into briquets by passing a mass of the tacky mixture along an apron which feeds the mass into a bite formed between two mated heated rollers which rotate in opposite directions, the rollers having pockets or cavities in their surfaces, and thereafter removing the compacted masses from the pockets or cavities on the discharge side of the bite.

Typical by-product slag containing potentially economic titanium values showed the following percentage composition, calculated as the oxides, for which an analysis was made:

Table I

| Percent by weight | Oxide |
|---|---|
| 72 | $TiO_2$ |
| 9 to 10 | Iron oxides calculated as FeO |
| 5.7 | $SiO_2$ |
| 5.7 | MgO |
| 5.4 | $Al_2O_3$ |
| 0.8 | CaO |
| 0.25 | MnO |
| Balance 1.15 to 0.15 | Not determined |

The following examples illustrate modes of practicing the invention:

EXAMPLE 1

A 4,000 gram mixture composed of 30 parts by weight of pulverized petroleum coke and 70 parts by weight of pulverized by-product slag showing the above analysis was added to 548 grams of 36.5 percent hydrochloric acid and 252 grams of water in a stainless steel container and mixed for 2 minutes to form a tacky mixture. Twenty-five gram portions of the tacky mixture were expressed under a pressure of 7,000 p.s.i. into 1⅛ inch-diameter cylindrical molds, ¾ inch long. The molds containing the mixture were dried at 300° C. for 40 minutes in an electric oven to form briquets. The briquets were removed from the molds and subjected to a compression test by placing them separately in an hydraulic press and applying pressure until the breaking point of the briquet was reached as indicated by a sharp falling off in pressure. The average breaking point of the briquets was 1010 p.s.i.

EXAMPLE 2

Pulverized slag showing the above analysis and pulverized petroleum coke, both sufficiently fine that at least 99 percent would pass through a 325 mesh screen, were intimately dry-mixed in the ratio by weight of 77 parts slag to 23 parts of coke. The resulting mixture was fed by means of a hopper equipped with a feed screw into one end of a rotating open-end cylinder which was 30 inches in diameter and 8 feet long. The cylinder was inclined from a horizontal position so that the exit end thereof was positioned 2.75 inches lower than the feed end to provide a gradual slope to aid the progress of material passing therethrough. An electric motor engaged a variable speed control gearing which was set to rotate the cylinder at 9.6 r.p.m.

Twenty percent strength hydrochloric acid was fed by means of two nozzles positioned in the rotating cylinder near the top of the feed end thereof about one foot apart axially of the cylinder so as to spray acid onto the pulverulent mixture of coke and slag.

Another portion of the same mixture was made into pellets following the recipe and procedure described in the paragraph above except that an aqueous solution of NaOH, prepared by admixing 3 parts NaOH and 10 parts water by weight, was added instead of hydrochloric acid.

Table II below shows the results of various rates of feed wherein one or two hydrochloric acid nozzles were employed with or without added water.

Table II

| Slag-coke Rate, Lb./Hr. | Lb./Hr. of 20% HCl | | $H_2O$ Lb./Hr. |
|---|---|---|---|
| | Nozzle 1 | Nozzle 2 | |
| 2,050 | 226 | none | 114 |
| 2,100 | 235 | none | 85 |
| 2,650 | 217 | 50 | none |
| 2,650 | 395 | 35 | none |
| 2,650 | 296 | 50 | none |
| 3,500 | 395 | 75 | none |
| 3,500 | 395 | 55 | none |
| 2,050 | 197 | 35 | none |
| 2,800 | 275 | 35 | none |
| 2,800 | 275 | | none |

The pellets were dried at 200° C. for 40 minutes in an electric oven. The coke-titaniferous material containing HCl was then in the form of firm strong cohesively bonded spheroidal bodies. That in which NaOH was used was not well bonded and the pellets containing NaOH readily crumbled. Pellets made as described containing HCl and those containing NaOH were repeatedly dropped (from 6 to 8 times) onto a concrete floor from a height of 5 feet. In this test, there was no appreciable breaking of the pellets bonded by HCl but there was almost 100% breakage of those bonded by NaOH.

EXAMPLE 3

A tacky mixture was prepared by admixing by weight 73 percent pulverulent slag having the above analysis, 22 percent pulverulent petroleum coke, and 5 percent of 30 percent by weight strength hydrochloric acid and dried in an oven as in Example 1. The pellets thus formed were then transferred to a transparent chlorinating furnace equipped with a chlorine gas inlet line at the bottom and an outlet gas line near the top, the outlet line being provided with a condenser for condensing the $TiCl_4$ reaction product formed. The pellets in the furnace were heated to and maintained at a temperature above 700° C. Chlorine gas was passed up through the mass of pellets. There was a good yield of $TiCl_4$ at 700° C. There was no channeling or unequal distribution of the chlorine gas observable as it passed through the mass of pellets and no formation of cementitious or glazy substances or clinkering could be observed.

EXAMPLE 4

Example 3 above was repeated except that the mixture here consisted of 59 percent slag, 18 percent petroleum coke and 23 percent of 30 percent by weight hydrochloric acid. The efficiency of the chlorination process was determined according to the following formula:

$$100\% - \left(\frac{\text{Percent Ti left in the chlorination residue}}{\text{Percent Ti charged in the chlorination chamber}} \times 100\%\right) = \text{Percent efficiency}$$

Table III below shows the efficiency of the chlorination process employing pellets made according to Examples 3 and 4.

Table III

| Weight percent of 30 percent Strength HCl Used | Ti Efficiency Based on Ore Residue |
|---|---|
| 5 percent (from Example 3) | 96.5 percent. |
| 23 percent (from Example 4) | 90.0 percent. |

Valuable advantages stem from practicing the process of the invention. Admixing hydrochloric acid with pulverized titaniferous by-product furnace slag and a carbonaceous material produces a highly cohesive mixture which can be formed into pellets or briquets and indurated by heat; the pellets or briquets then can be shoveled about and stored as desired without appreciable breakage. When chlorine gas is passed through a mass of such pellets or briquets in a heated chamber, no objectionable substances are formed. The reaction with the chlorine begins at a relatively low temperature and the efficiency of the chlorination process is high.

Having described the invention, what is claimed and desired to be protected by Letters Patent is:

1. In the method of preparing for chlorination a mixture of pulverulent carbonaceous material containing fixed carbon and titaniferous material selected from the class consisting of the oxides and silicates of titanium containing impurities which form cementitious and glazy substances at temperatures of 600° C. and above, the improvement which comprises admixing hydrochloric acid, containing between 5 and 37 percent of dissolved hydrogen chloride by weight, to said mixture in an amount sufficient to incorporate between 1 and 5 percent hydrogen chloride therein and drying the mixture.

2. The method of agglomerating an intimate mixture of pulverulent coke and by-product furnace slag containing titanium values and siliceous impurities preparatory to passing chlorine gas therethrough at a temperature of at least 600° C. which comprises the steps of: adding to said mixture hydrochloric acid at a temperature not substantially above room temperature and in sufficient amount to impart a tacky consistency to said mixture; forming the resulting tacky mixture into compact bodies having their greatest dimension between $\frac{1}{16}$ and $1\frac{1}{4}$ inch, and indurating the bodies by substantially drying them.

3. The method according to claim 2 wherein the hydrochloric acid added contains between 5 and 37 percent by weight of hydrogen chloride.

4. The method according to claim 3 wherein the hydrochloric acid is added in sufficient amount to incorporate between 1 and 5 percent hydrogen chloride and between 7 and 18 percent water in said mixture.

5. The method of claim 4 wherein the compact bodies are formed by spraying the hydrochloric acid onto the intimate mixture while being subjected to a rolling motion in a rotating cylinder and continuing the rolling motion of the tacky mixture thus formed until a substantial portion thereof has been formed into pellets.

6. The method of claim 4 wherein the compact bodies are formed by incorporating the hydrochloric acid into the intimate mixture and thereafter subjecting the tacky mixture thus formed to a rolling motion in a rotating cylinder until a substantial portion thereof has been formed into pellets.

7. The method according to claim 4 wherein the compact bodies are formed into briquets by expressing portions of the tacky mixture into molds.

8. The method according to claim 4 wherein the compact bodies are dried by subjecting them to heat at a temperature between 150° and 300° C. for at least 20 minutes.

References Cited in the file of this patent

UNITED STATES PATENTS

| | | |
|---|---|---|
| 2,287,663 | Brassert | June 23, 1942 |
| 2,391,588 | Naratil | Dec. 25, 1945 |
| 2,660,569 | Reitlinger | Nov. 24, 1953 |
| 2,805,120 | Plant | Sept. 3, 1957 |

OTHER REFERENCES

Chemical Week, "Fluid Route Bypasses Problems," pp. 84–86, Mar. 19, 1955.